(12) United States Patent
Koseoglu et al.

(10) Patent No.: US 11,104,851 B2
(45) Date of Patent: Aug. 31, 2021

(54) METHOD AND PROCESS FOR DEPOLYMERIZATION OF A PLASTIC POLYMER

(71) Applicant: SAUDI ARABIAN OIL COMPANY, Dhahran (SA)

(72) Inventors: Omer Refa Koseoglu, Dhahran (SA); Robert Peter Hodgkins, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/775,931

(22) Filed: Jan. 29, 2020

(65) Prior Publication Data

US 2021/0230485 A1    Jul. 29, 2021

(51) Int. Cl.
*C10G 1/10* (2006.01)

(52) U.S. Cl.
CPC ....... *C10G 1/10* (2013.01); *C10G 2300/1003* (2013.01); *C10G 2300/202* (2013.01); *C10G 2300/208* (2013.01); *C10G 2300/302* (2013.01); *C10G 2300/308* (2013.01); *C10G 2400/02* (2013.01); *C10G 2400/20* (2013.01)

(58) Field of Classification Search
CPC ..... C07C 1/00; C07C 4/00; C07C 4/22; C08J 11/08; C08J 2335/06
See application file for complete search history.

(56) References Cited

U.S. PATENT DOCUMENTS

| | | | |
|---|---|---|---|
| 5,288,934 A | 2/1994 | De Broqueville | |
| 5,569,801 A * | 10/1996 | de Broqueville | C10G 1/10 585/241 |
| 9,212,318 B2 | 12/2015 | Narayanaswamy et al. | |
| 9,428,695 B2 | 8/2016 | Narayanaswamy et al. | |
| 10,053,401 B1 | 8/2018 | Beadle et al. | |
| 10,093,873 B2 | 10/2018 | Koseoglu et al. | |
| 10,294,172 B2 | 5/2019 | Beadle et al. | |
| 10,508,066 B2 | 12/2019 | Koseoglu et al. | |

(Continued)

FOREIGN PATENT DOCUMENTS

| | | |
|---|---|---|
| EP | 0599795 A1 | 6/1994 |
| WO | 199514069 | 5/1995 |

(Continued)

OTHER PUBLICATIONS

Dement'Ve, et al., "Thermal depolymerization of polystyrene in highly aromatic hydrocarbon medium," J. Analytical Applied Pyrolysis, vol. 142, Sep. 2019, 104612.

(Continued)

*Primary Examiner* — Sharon Pregler
(74) *Attorney, Agent, or Firm* — Bracewell LLP; Constance Gall Rhebergen

(57) ABSTRACT

Methods for depolymerization of a plastic polymer. An embodiment includes supplying a plastic polymer and aromatic bottoms from an aromatic recovery complex, the aromatic bottoms comprising C9+ aromatic compounds; dissolving the plastic polymer in the aromatic bottoms to obtain a dissolved plastic polymer solution comprising dissolved plastic polymer and C9+ aromatic compounds; and catalytically cracking the dissolved plastic polymer solution in the presence of a catalyst such that the dissolved plastic polymer and the C9+ aromatic compounds are cracked to obtain light products.

21 Claims, 6 Drawing Sheets

(56) References Cited

U.S. PATENT DOCUMENTS

2009/0062581 A1* 3/2009 Appel .................. B09B 3/00
                                                    585/241
2012/0108863 A1   5/2012 Tippet et al.
2019/0119191 A1* 4/2019 Streiff ................ C10G 57/00

FOREIGN PATENT DOCUMENTS

WO    2012033742 A1    3/2012
WO    2014175978 A1   10/2014
WO    2018107204 A1    6/2018

OTHER PUBLICATIONS

Schubert, et al., "Influence of reaction pressure on co-pyrolysis of LDPE and a heavy petroleum fraction," Fuel Processing Tech., vol. 193, Oct. 2019, pp. 204-211.
International Search Report and Written Opinion of PCT Application No. PCT/US2021/070093 dated Jun. 28, 2021: pp. 1-9.

* cited by examiner

METHOD AND PROCESS FOR DEPOLYMERIZATION OF A PLASTIC POLYMER

BACKGROUND OF THE INVENTION

1. Technical Field

The disclosure relates to processing plastic polymers with hydrocarbons to obtain light products. More specifically, the disclosure relates to catalytically cracking dissolved waste plastic polymers to depolymerize the polymers and obtain light products.

2. Discussion of Related Art

Disposal of plastic waste, one of the most abundant modern wastes, is challenging because plastic generally does not readily decompose. The useful life of plastic waste is sometimes prolonged by recycling, but recycling plastic waste is not always economically feasible. Often the most economical conventional means of disposing plastic waste is by incineration or landfill.

Attempts have been made to convert plastic waste into hydrocarbon products, or their original constituent monomers by means of delayed coking, pyrolysis, gasification, and liquefaction. In the latter processing route, plastic waste is processed alone or by chemically dissolving the plastic waste in a hydrocarbon solvent and then treating it in a conventional refining process. But these processes results in some wasted product, and the solvents used in these processes can introduce contaminants such as sulfur and nitrogen. Other solvents have been used, but they often include valuable hydrocarbons that produce light aromatics such as benzene, toluene, and xylenes. Such processes are generally uneconomical.

SUMMARY OF THE INVENTION

Disclosed are methods and systems for dissolving and depolymerizing plastic polymers to obtain light products including light olefins, benzene, toluene, and xylenes. A method for depolymerization of a plastic polymer in an aromatic-rich solvent is disclosed. The method includes supplying the plastic polymer and aromatic bottoms from an aromatic recovery complex, the aromatic bottoms having C9+ aromatic compounds; dissolving the plastic polymer in the aromatic bottoms to obtain a dissolved plastic polymer solution having dissolved plastic polymer and C9+ aromatic compounds; catalytically cracking the dissolved plastic polymer solution in the presence of a catalyst such that the dissolved plastic polymer and the C9+ aromatic compounds are cracked to obtain light products. The aromatic bottoms can include a compound selected from the group consisting of alkyl-bridged noncondensed multiaromatic compounds, condensed multiaromatic compounds, heavy alkyl aromatic compounds, and combinations of the same. In at least one embodiment, the aromatic bottoms includes C9+ hydrocarbons from a xylene rerun unit. In at least one embodiment, the plastic polymer can include a polymer selected from the group consisting of polyethene, polyethylene terephthalate, polystyrene, polyolefins, polypropylene, polyvinyl chloride, polyamide, polycarbonate, polyurethane, polyester, natural rubber, synthetic rubber, and combinations of the same.

In at least one embodiment, the step of catalytically cracking the dissolved plastic polymer solution also includes catalytically cracking the dissolved plastic polymer solution in a riser FCC reactor. In at least one embodiment, the step of catalytically cracking the dissolved plastic polymer solution also includes catalytically cracking the dissolved plastic polymer solution in a downer FCC reactor. In at least one embodiment, the light products includes a molecule selected from the group consisting of propene, ethene, butenes, benzene, toluene, xylenes, and combinations of the same. In at least one embodiment, the plastic polymer includes waste plastic polymer. In at least one embodiment, the step of supplying the plastic polymer also includes crushing the plastic polymer such that the plastic polymer has an average particle size that is between 0.01 cm and 6 cm. In at least one embodiment, the plastic polymer can be completely dissolved in the aromatic bottoms. In at least one embodiment, the dissolved plastic polymer solution can be saturated with the dissolved plastic polymer.

A method for depolymerization of a plastic polymer is disclosed. The method includes supplying aromatic bottoms from an aromatic recovery complex, the aromatic bottoms having C9+ aromatic compounds; hydrodearylating the aromatic bottoms to obtain hydrodearylated aromatic bottoms; supplying the plastic polymer and dissolving it in the hydrodearylated aromatic bottoms to obtain a dissolved plastic polymer solution having dissolved plastic polymer and C9+ aromatic compounds; catalytically cracking the dissolved plastic polymer solution in the presence of a catalyst such that the dissolved plastic polymer and the C9+ aromatic compounds are cracked to obtain light products. The aromatic bottoms can include a compound selected from the group consisting of alkyl-bridged noncondensed multiaromatic compounds, condensed multiaromatic compounds, heavy alkyl aromatic compounds, and combinations of the same. In at least one embodiment, the aromatic bottoms includes C9+ hydrocarbons from a xylene rerun unit. In at least one embodiment, the plastic polymer includes a polymer selected from the group consisting of polyethene, polyethylene terephthalate, polystyrene, polyolefins, polypropylene, polyvinyl chloride, polyamide, polycarbonate, polyurethane, polyester, natural rubber, synthetic rubber, and combinations of the same.

In at least one embodiment, the step of catalytically cracking the dissolved plastic polymer solution also includes catalytically cracking the dissolved plastic polymer solution in a riser FCC reactor. In at least one embodiment, the step of catalytically cracking the dissolved plastic polymer solution also includes catalytically cracking the dissolved plastic polymer solution in a downer FCC reactor. In at least one embodiment, the downer FCC reactor can be operated at a temperature between 550° C. and 650° C. In at least one embodiment, the downer reactor can be operated such that the catalyst and the dissolved plastic polymer solution have a residence time between 0.1 seconds and 1 second. In at least one embodiment, the catalyst and the dissolved plastic polymer solution can be introduced to the downer FCC reactor with a weight ratio of catalyst to dissolved plastic polymer solution that is between 15 and 40. In at least one embodiment, the light products include a molecule selected from the group consisting of propene, ethene, butenes, benzene, toluene, xylenes, and combinations of the same.

BRIEF DESCRIPTION OF THE DRAWINGS

The embodiments disclosed will be understood by the following detailed description along with the accompanying drawings. The embodiments shown in the figures only illustrate several embodiments of the disclosure. The disclosure admits of other embodiments not shown in the figures, and is not limited to the content of the illustrations. Similar streams, units, or features may have similar reference labels in the drawings.

DETAILED DESCRIPTION OF THE DRAWINGS

Figure 1:
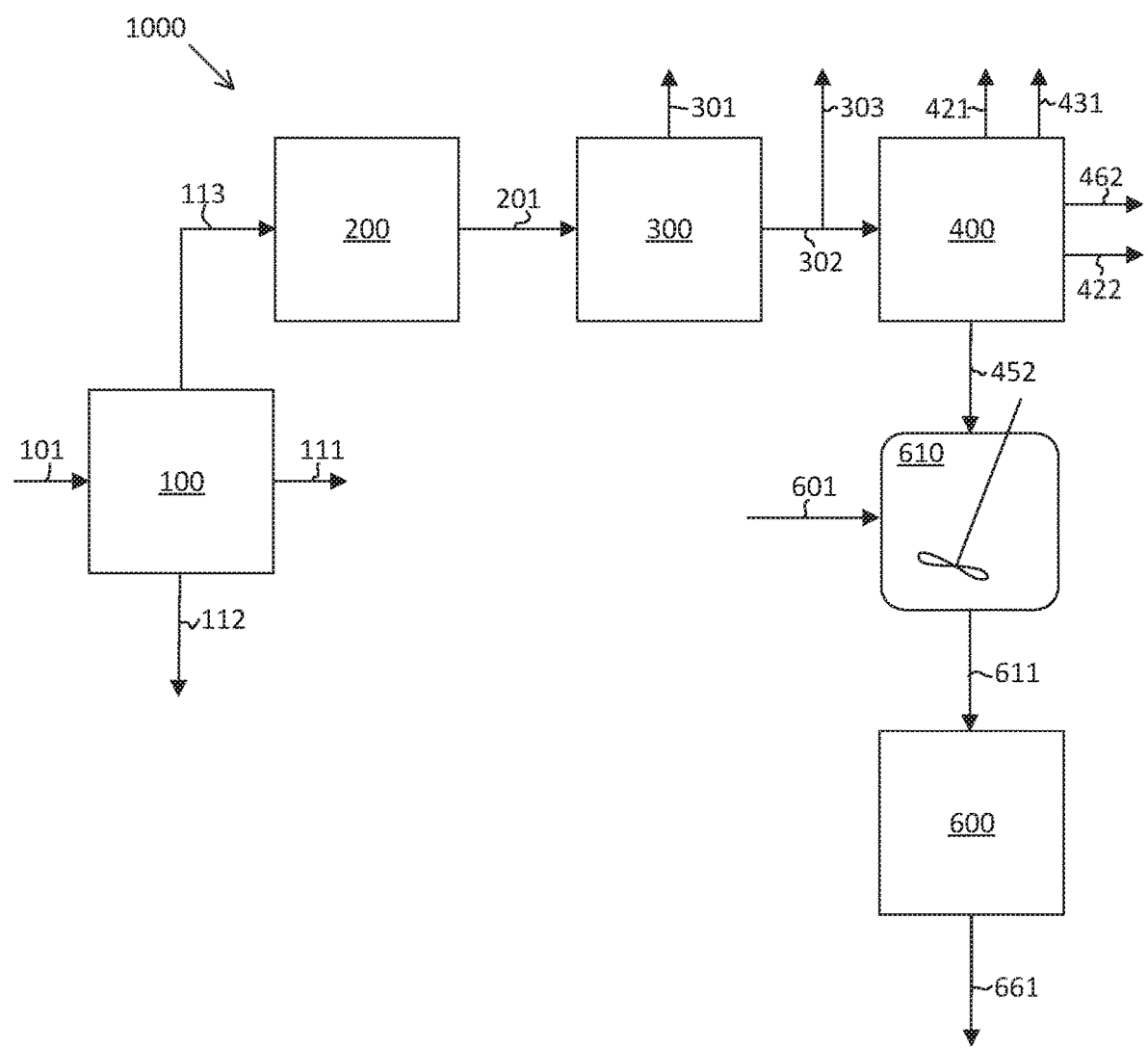
FIG. 1 is a schematic diagram of a process for converting waste polymer to a petrochemical product according to various embodiments using aromatic bottoms from an aromatic recovery complex.

For certain embodiments, many details are provided for thorough understanding of the various components or steps. In other instances, known processes, devices, compositions, and systems are not described in particular detail so that the embodiments are not obscured by detail. Likewise, illustrations of the various embodiments can omit certain features or details so that the various embodiments are not obscured.

The drawings provide an illustration of certain embodiments. Other embodiments can be used, and logical changes can be made without departing from the scope of this disclosure. The following detailed description and the embodiments it describes should not be taken in a limiting sense. This disclosure is intended to disclose certain embodiments with the understanding that many other undisclosed changes and modifications can fall within the spirit and scope of the disclosure. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," "in at least one embodiment," or "in embodiments," which can each refer to one or more of the same or different embodiments. Furthermore, the terms "comprising," "including," "having," and the like, as used with respect to embodiments of the present disclosure are synonymous.

In this disclosure and the appended claims, unless otherwise indicated, all numbers expressing quantities, percentages or proportions, and other numerical values used in the specification and claims are to be understood as being modified in all instances by the term "about." The term "about" applies to all numeric values, whether or not explicitly indicated. Values modified by the term "about" can include a deviation of at least ±5% of the given value unless the deviation changes the nature or effect of the value such that it is not operable to achieve its intended purpose.

Ranges can be expressed in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit, as well as the upper limit and the lower limit; and includes lesser ranges of the interval subject to any specific exclusion provided.

Unless otherwise defined, all technical and scientific terms used in this specification and the appended claims have the same meanings as commonly understood by one of ordinary skill in the relevant art.

Ordinal numbers (such as "first," "second," "third," and so on), when used in this disclosure as an adjectives before a term, merely identify a particular component, feature, step, or combination of these unless expressly provided otherwise. At times, ordinal numbers may be used to distinguish a particular feature, component, or step from another feature, component, or step that is described by the same term or similar term. Unless expressly provided otherwise, ordinal numbers do not indicate any relationship, order, quality, ranking, importance, or characteristic between features, components, steps, or combinations of these. Moreover, ordinal numbers do not define a numerical limit to the features, components, steps, or combination they identify.

Where a method comprising two or more defined steps is recited or referenced in this disclosure, or the appended claims, the defined steps can be carried out in any order or simultaneously except where the context excludes that possibility.

In the figures, fluid streams can be represented by lines. A person of ordinary skill will understand that fluid streams can be conveyed by various means, including but not limited to pipes, conduit, channels, and their attachments and fittings. Though other equipment, such as pumps, valves, heat exchangers, storage tanks, controllers, and so forth, may be present in various embodiments, such equipment is not shown in the figures for the sake of clarity.

As used in this disclosure, the term "waste polymer" refers to any plastic polymer material that is unsuitable for use as a commercial product, but is suitable for recycling or disposal. Nonlimiting examples of suitable plastic polymer material include polyethene (also referred to as polyethylene), polyethylene terephthalate, polystyrene, polyolefins, polypropylene, polyvinyl chloride, polyamide, polycarbonate, polyurethane, polyester, and natural and synthetic rubber.

As used in this disclosure, the term "particle size" refers to the distance in a straight line between the two most distant points on the outer surface of the particle. For example, a spherical particle has a particle size equal to its diameter and a rectangular prism-shaped particle has a particle size that is equal to the diagonal line or hypotenuse extending between the two most distant corners.

As used in this disclosure, the term "hydrodearylation" refers to a process for the cleaving of the alkyl bridge of noncondensed alkyl-bridged multiaromatics or heavy alkyl aromatic compounds to form alkyl mono-aromatics, in the presence a catalyst and hydrogen.

The disclosed methods and processes provide alternatives to conventional waste polymer disposal methods that result in the production of useful and valuable petrochemicals. In addition to providing alternative methods for disposing of waste polymers, the methods and processes disclosed make economical use of low-value hydrocarbon streams. It has been found that aromatic bottoms from an aromatic recovery complex can dissolve plastic polymer material for catalytic cracking processes to recover monomers from the plastic polymer material.

In FIG. 1, crude oil 101 is distilled in atmospheric distillation unit 100 to obtain naphtha (which boils in the range of about 36-180° C.) and diesel (which boils in the range of about 180-370° C.). An atmospheric residue fraction in atmospheric residue stream 112 boils at about 370° C. and greater. Naphtha stream 113 is hydrotreated in naphtha hydrotreating unit 200 to reduce sulfur and nitrogen content to less than about 0.5 ppmw, and the hydrotreated naphtha stream 201 is sent to naphtha reforming unit 300 to improve its quality, or in other words increase the octane number to obtain a gasoline blending stream or feedstock for an aromatics recovery unit. Diesel stream 111 is hydrotreated in a diesel hydrotreating unit (not shown) to desulfurize the diesel oil and obtain a diesel fraction complying with diesel fuel specifications (such as less than 10 ppmw sulfur). An atmospheric residue fraction is either used as a fuel oil component or sent to other separation or conversion units to convert low-value hydrocarbons to high-value products. Reformate stream 302 from naphtha reforming unit 300 can be used as a gasoline blending component (stream 303) or sent to an aromatic recovery complex 400 to recover aromatics such as benzene, toluene, and xylenes (collectively "BTX").

Figure 3:
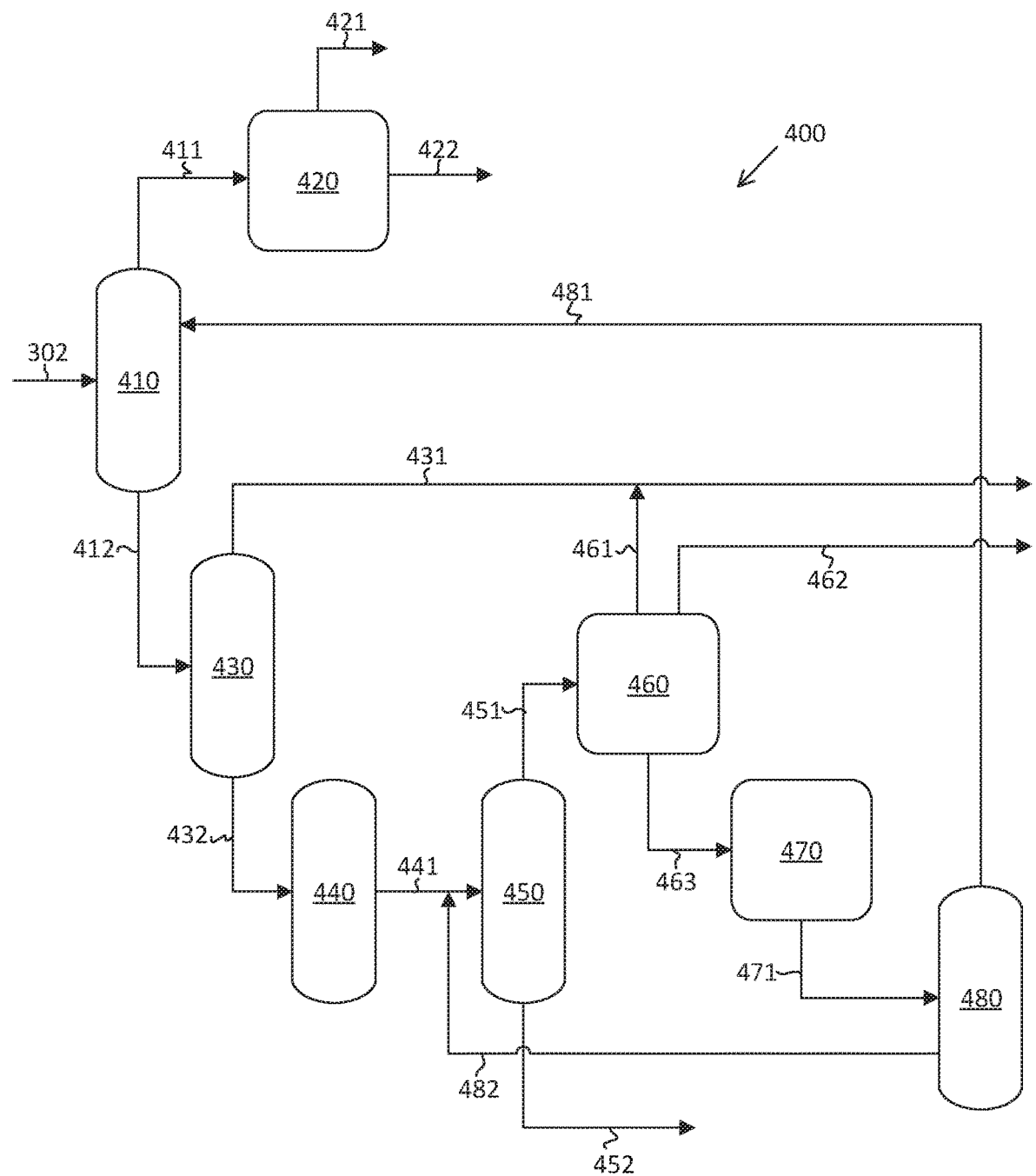
FIG. 3 is a schematic illustration of an aromatic recovery complex and process for obtaining benzene, toluene, and p-xylene that also produces aromatic bottoms.

Referring now to FIG. 3, a schematic illustration of an aromatic recovery complex 400 is shown. Reformate stream 302 from a catalytic reforming unit, such as naphtha reforming unit 300 of FIG. 1, is split into two fractions; light reformate stream 411 having C5 and C6 hydrocarbons, and heavy reformate stream 412 having C7+ hydrocarbons. A reformate splitter 410 separates reformate stream 302 to obtain a light reformate stream 411 and a heavy reformate stream 412. The light reformate stream 411 is sent to a benzene extraction unit 420 to extract benzene as benzene product in benzene stream 422, and to recover substantially benzene-free gasoline in raffinate motor gasoline (mogas) stream 421. The heavy reformate stream 412 is sent to a splitter 430 which produces a C7 cut mogas stream 431 and a C8+ hydrocarbon stream 432.

Most aromatic recovery complexes are configured to maximize p-xylene production. The C8+ hydrocarbon stream 432 is treated in a clay treater 440 to remove olefins and obtain olefin-free C8+ product stream 441, which is fed to a xylene rerun unit 450 to separate the C8+ hydrocarbons into C8 hydrocarbon stream 451 and aromatic bottoms stream 452 having C9+ hydrocarbons. The C8 hydrocarbon stream 451 proceeds to a p-xylene extraction unit 460 to recover p-xylene in p-xylene product stream 462. p-Xylene extraction unit 460 also produces a C7 cut mogas stream 461, which combines with C7 cut mogas stream 431. Other xylenes are recovered and sent to xylene isomerization unit 470 by other xylene stream 463 to convert them to p-xylene. The isomerized xylenes are sent to xylene splitter column 480. The converted fraction is recycled back to p-xylene extraction unit 460 from xylene splitter column 480 by way of xylene splitter bottom stream 482, xylene rerun unit 450, and C8 hydrocarbon stream 451. Splitter top stream 481 is recycled back to reformate splitter 410. The heavy fraction from the xylene rerun unit 450 is recovered as aromatic bottoms in aromatic bottoms stream 452. In at least one embodiment, the aromatic bottoms stream 452 can be fractionated to obtain C9 and C10 components, and a C11+ reject stream. The C9 and C10 components can be sent to a toluene, C9, C10, transalkylation/toluene disproportionation (TA/TDP) unit, and the C11+ components can be removed as aromatic bottoms that are in the absence of C10− components.

In at least one embodiment, the aromatic bottoms from aromatic bottoms stream 452 can include C9+ aromatic hydrocarbons; including alkyl-bridged noncondensed multiaromatic compounds, condensed multiaromatic compounds, heavy monoaromatic compounds (that is, at least one alkyl group with more than seven carbon atoms), and combinations of the same. In at least one embodiment, the aromatic bottoms stream 452 can be in the absence of C9− components and can include C10+ components; including alkyl-bridged noncondensed multiaromatic compounds, condensed multiaromatic compounds, heavy monoaromatic compounds, and combinations of the same. In at least one embodiment, the aromatic bottoms stream 452 can be in the absence of C10− components and can include C11+ components; including alkyl-bridged noncondensed multiaromatic compounds, condensed multiaromatic compounds, heavy monoaromatic compounds, and combinations of the same. Not intending to be limited by any particular technical theory, it is believed that alkenyl aromatics react across Lewis acid sites in the clay tower via a Friedel-Crafts reaction to form multiaromatic compounds with alkyl bridges that connect aromatic rings. This reaction typically occurs at temperatures of about 200° C. or greater. Alkenyl aromatics can react with these compounds to form multiaromatic compounds having additional aromatic rings connected by alkyl bridges. Such noncondensed multiaromatic compounds having two or more aromatic rings connected by alkyl bridges can be characterized as having a relatively high density (that is, above about 900 kilograms per cubic meter ($kg/m^3$)), a darker brown color (Standard Reference Method Color greater than 20) than nonbridged alkyl aromatics, and a boiling point above about 250° C. Still not intending to be limited by any particular technical theory, it is also believed that nonaromatic olefins react across Lewis acid sites in the clay tower with monoaromatic molecules via a Friedel-Crafts reaction to form heavy monoaromatic compounds having at least one alkyl group with more than seven carbon atoms. This reaction typically also occurs at temperatures of about 200° C. or greater. These heavy monoaromatic compounds can be characterized as having density that is above about 800 $kg/m^3$ and a boiling point of about 250° C. or greater. The heavy monoaromatic compounds and alkyl-bridged noncondensed multiaromatic compounds produced by these reactions ultimately leave the aromatic recovery complex in aromatic bottoms stream 452. In at least one embodiment, the aromatic bottoms can have a boiling point above about 100° C., preferably above about 150° C., more preferably above about 180° C.

By way of example and not limitation, Formula I, Formula II, and Formula III show various examples of alkyl-bridged noncondensed multiaromatic compounds.

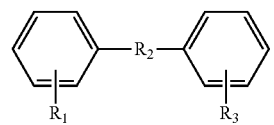

[Formula I]

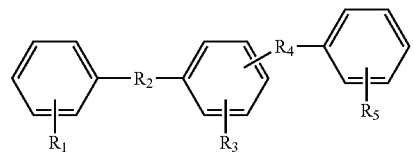

[Formula II]

-continued

[Formula III]

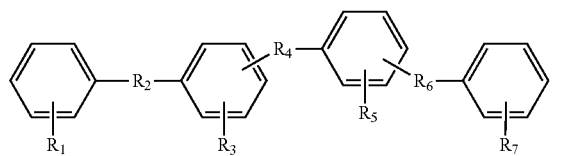

$R_2$, $R_4$, and $R_6$ are alkyl bridge groups independently having from two to six carbon atoms. $R_1$, $R_3$, $R_5$, and $R_7$ are independently selected from the group consisting of hydrogen and an alkyl group having from one to eight carbon atoms. In formula I, $R_{1-3}$ are selected such that the total number of carbon atoms in the molecule is at least sixteen. In addition to the groups $R_1$, $R_3$, $R_5$, and $R_7$, the benzene groups of Formulas I, II, and III can further include additional alkyl groups connected to the benzene groups. In addition to the four benzene groups of Formula III, the various alkyl-bridged noncondensed alkyl aromatic compounds can include five or more benzene groups connected by alkyl bridges, where the additional benzene groups further can include alkyl groups connected to the additional benzene groups.

In addition to alkyl-bridged noncondensed multiaromatic compounds and heavy monoaromatic compounds, the aromatic bottoms from an aromatic recovery complex can include condensed multiaromatic compounds. By way of example and not limitation, examples of condensed multiaromatic are shown in Formula IV, Formula V, Formula VI, and Formula VII.

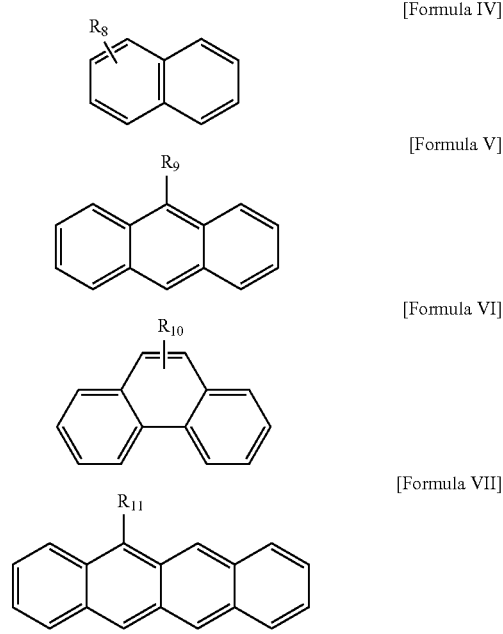

[Formula IV]

[Formula V]

[Formula VI]

[Formula VII]

Formula IV, Formula V, Formula VI, and Formula VII show examples of condensed multiaromatics. The fused rings in the formulas are characteristic of condensed multiaromatics. $R_8$, $R_9$, $R_{10}$, and $R_{11}$ are independently selected from the group consisting of hydrogen and an alkyl group having from one to eight carbon atoms. The positions of $R_8$, $R_9$, $R_{10}$ and $R_{11}$ are exemplary only, and additional alkyl groups can bond to benzene groups in Formula IV, Formula V, Formula VI, and Formula VII in other locations.

Referring again to FIG. 1, the plastic polymer material can be prepared for processing. The plastic polymer material can be prepared by comminution such as by crushing, milling, shredding, or pelletizing the plastic polymer material. In at least one embodiment, the plastic polymer material is a powder. In at least one embodiment, the plastic polymer material has a particle size that is between about 0.01 centimeters (cm) and about 6 cm, alternatively between about 0.01 cm and about 3 cm, preferably between about 0.01 cm and about 1 cm. The plastic polymer material can be any plastic polymer. Nonlimiting examples of suitable plastic polymer material include polyethene (also referred to as polyethylene), polyethylene terephthalate, polystyrene, polyolefins, polypropylene, polyvinyl chloride, polyamide, polycarbonate, polyurethane, polyester, and natural and synthetic rubber. In at least one embodiment, the plastic polymer material is virgin plastic (that is, unused raw plastic material). In at least one embodiment, the plastic polymer material is waste plastic. In FIG. 1, the plastic polymer material is introduced to mixing unit 610 by plastic polymer material stream 601, where it is mixed with the aromatic bottoms from aromatic bottoms stream 452. In at least one embodiment, the aromatic bottoms includes C9+ components in the absence of C8− components. In at least one embodiment, the aromatic bottoms includes C10+ components in the absence of C9− components. In at least one embodiment, the aromatic bottoms includes C11+ components in the absence of C10−components. The mixing unit 610 can be any equipment suitable for mixing the plastic polymer material and the aromatic bottoms.

It has been found that aromatic bottoms from an aromatic recovery complex can be a suitable solvent for dissolving plastic polymer material. The mixing can be carried out continuously or in a batch process. In at least one embodiment, the mixing unit can be a continuously stirred tank. The mixing unit 610 can be operated at a temperature between about 20° C. and about 300° C., preferably between about 80° C. and about 250° C. In at least one embodiment, the plastic polymer material can be completely dissolved. The aromatic bottoms dissolves the plastic polymer material to produce dissolved plastic polymer, which leaves the mixing unit 610 in dissolved plastic polymer stream 611. Dissolved plastic polymer stream 611 includes the dissolved plastic polymer and the aromatic bottoms; which can include alkyl-aromatic noncondensed multiaromatic compounds, condensed multiaromatics, heavy alkyl aromatics, and combinations of the same. In at least one embodiment, the dissolved plastic polymer stream 611 is saturated with plastic polymer material (that is, the dissolved plastic polymer stream 611 contains the maximum equilibrium amount of the plastic polymer material at the mixing temperature). The dissolved plastic polymer stream 611 is then sent to FCC unit 600.

Figure 5:
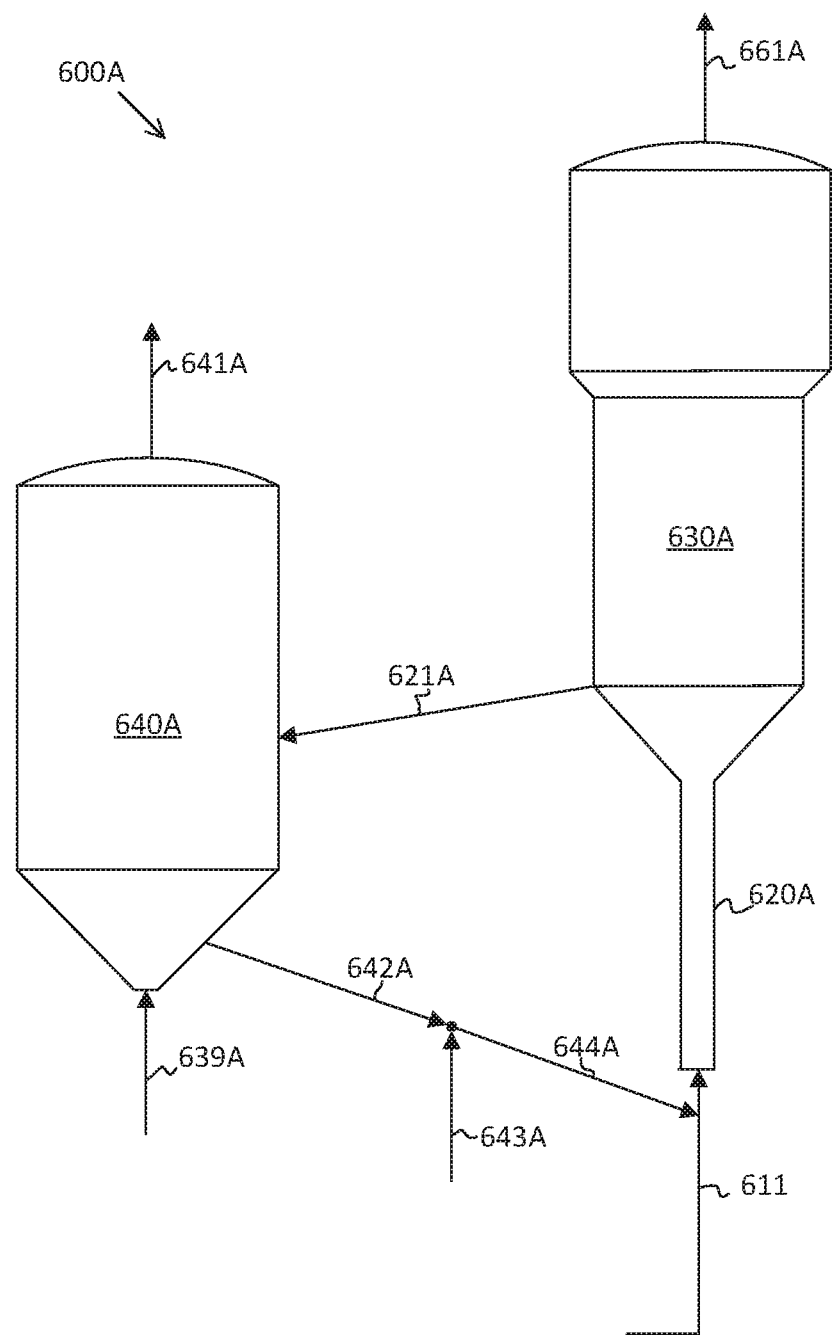
FIG. 5 is a schematic illustration of a riser FCC unit for cracking dissolved waste polymer.
Figure 6:
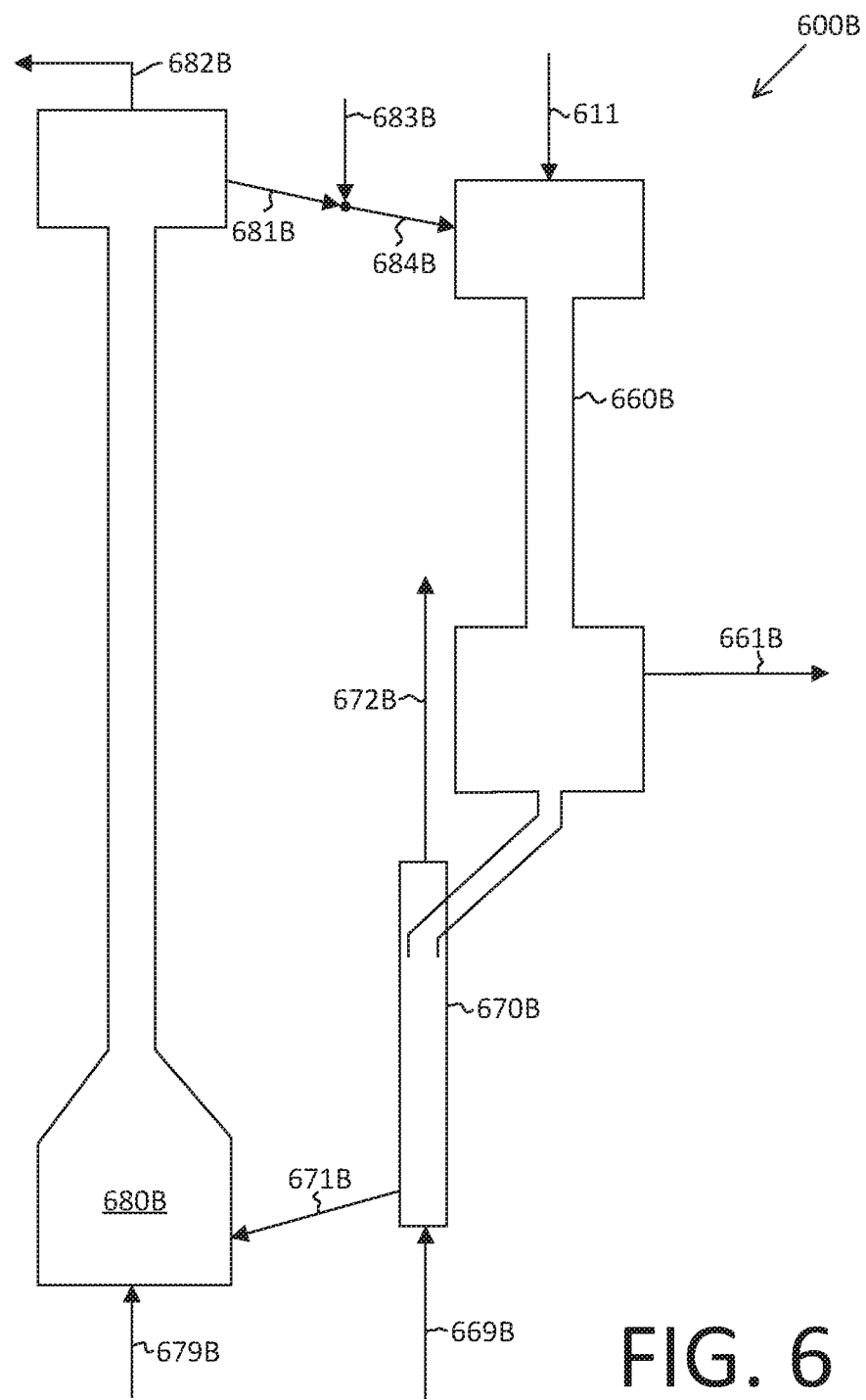
FIG. 6 is a schematic illustration of a downflow FCC unit for cracking dissolved waste polymer.

In at least one embodiment, the dissolved plastic polymer stream 611 can be preheated before being introduced to FCC unit 600. The FCC unit 600 includes a fluidized reactor configured to catalytically crack the dissolved plastic polymer stream 611. Examples of FCC units configured to catalytically crack dissolved plastic polymer stream 611 are shown in FIG. 5 and FIG. 6. Referring to FIG. 5, dissolved plastic polymer stream 611 can be mixed with a riser catalyst from riser catalyst stream 644A and then introduced to the riser 620A where the dissolved plastic polymer is vaporized and the riser catalyst is fluidized. In at least one embodiment, the riser catalyst can include a mixture of a base catalyst having an ultra-stable Y-type zeolite and a matrix that serves as a substrate for the zeolite, and an additive containing a zeolite whose pore diameter is less than the pore diameter of a Y-type zeolite such that only hydrocarbons with particular shapes can pass through the pores of the zeolite (such as ZSM-5, omega, SAPO-5, SAPO-11, SAPO-34, and pentasil-type aluminosilicates).

The vaporized plastic polymer and the aromatic compounds reacts in the presence of the riser catalyst to crack the polymer compounds and aromatic bottoms and produce cracked riser gases that include monomers of the polymer compounds and light aromatic products (e.g., benzene, toluene, xylenes, or any combination of the same). The riser 620A is operated at a temperature between about 450° C. and 700° C., preferably between about 500° C. and 650° C. The cracking reactions take place in the riser 620A within a period of time that is between about 0.1 seconds and about 30 seconds, preferably between about 0.1 and 5 seconds.

In the process of cracking the polymer molecules in the riser 620A, coke and other substances deposit on the riser catalyst resulting in a catalyst having decreased catalytic activity, or spent riser catalyst. The spent riser catalyst and dissolved plastic polymer then enter FCC separator 630A where the cracked riser gases are separated from the spent riser catalyst. In at least one embodiment, the separation is carried out in a cyclone (not shown). The cracked riser gases leave the FCC separator 630A in riser FCC effluent stream 661A, and the spent riser catalyst leaves in riser spent catalyst stream 621A. The riser spent catalyst stream 621A is sent to a regenerator 640A where the coke and other substances deposited on the spent catalyst are combusted with air from first air stream 639A to obtain regenerated riser catalyst and first regenerator flue gas. The regenerator 640A can be operated at a temperature between about 600° C. and about 800° C., and a pressure that is greater than the operating pressure of the riser 620A but less than about 3 bar. In at least one embodiment, the regenerator 640A is operated at a pressure that is about 0.7 bar greater than the pressure of the riser 620A.

Because the spent riser catalyst is heated in the regeneration process, the regenerated riser catalyst can provide heat necessary for carrying out endothermic reactions in the riser 620A. The regenerated riser catalyst leaves the regenerator 640A in regenerated riser catalyst stream 642A, and the first regenerator flue gas can pass through a separator (such as a cyclone; not shown) to remove entrained catalyst before leaving the regenerator 640A in first regenerator flue gas stream 641A. Make-up riser catalyst stream 643A can be combined with the regenerated riser catalyst stream 642A to produce riser catalyst stream 644A. In at least one embodiment, the flow of regenerated riser catalyst in regenerated riser catalyst stream 642A is regulated to control heat transfer to the reactants in riser 620A. In at least one embodiment, the spent catalyst can be stripped of hydrocarbons with steam before being introduced to the regenerator 640A. Though FIG. 5 shows a riser FCC unit with the riser 620A and the regenerator 640A side-by-side, a person of ordinary skill will conceive of various other effective arrangements as well; including a stacked configuration where the regenerator and the riser are oriented vertically with respect to each other and contained in a single vessel.

Referring to FIG. 6, dissolved plastic polymer from dissolved plastic polymer stream 611 and a downer catalyst from downer catalyst stream 684B are introduced to downer 660B. In the downer 660B, the downer catalyst and dissolved plastic polymer vapors flow downward in the direction of gravity. Because the dissolved plastic polymer vapors are not used to lift the downer catalyst particles, using the downer 660B instead of a riser allows for a greater ratio of downer catalyst to dissolved plastic polymer. In at least one embodiment, the downer 660B can be operated under high-severity fluid catalytic cracking (HS-FCC) conditions, that is a temperature between about 550° C. and about 650° C. (preferably between about 580° C. and about 630° C.), a short contact time between the catalyst and the dissolved plastic polymer that is between about 0.1 and about 1 seconds (preferably between about 0.2 and about 0.7 seconds), and a catalyst to oil weight ratio that is between about 15 and about 40 (preferably between about 20 and about 30). The contact time can be minimized by mixing and dispersing the downer catalyst and dissolved plastic polymer at the inlet to the downer 660B, and immediately separating them at the downer outlet. In at least one embodiment, the downer catalyst includes a mixture of a base catalyst having an ultra-stable Y-type zeolite and a matrix that serves as a substrate for the zeolite, and an additive containing a zeolite whose pore diameter is less than the pore diameter of a Y-type zeolite such that only hydrocarbons with particular shapes can pass through the pores of the zeolite (such as ZSM-5, omega, SAPO-5, SAPO-11, SAPO-34, and pentasil-type aluminosilicates).

Both thermal cracking and catalytic cracking occur under HS-FCC conditions, while undesirable secondary reactions (such as hydrogen transfer reactions) are suppressed. Thermal cracking can contribute to the formation of lighter products (such as dry gas) and coke, and catalytic cracking can increase the yield of propylene and butylene. Thermal cracking can be minimized by reducing the residence time of the downer catalyst and dissolved plastic polymer in the downer 660B.

The vaporized plastic polymer compounds and aromatic bottoms are cracked in the downer 660B to obtain cracked downer gases that include monomers of the polymer compounds and light aromatic products (e.g., benzene, toluene, xylenes, or any combination of the same). The cracked downer gases leave the downer 660B in downer FCC effluent stream 661B, and spent catalyst is conveyed to stripper 670B. The spent catalyst is stripped of hydrocarbons and plastic polymer monomers in the stripper 670B with steam from steam stream 669B to produce stripped downer catalyst. The steam and stripped hydrocarbons and monomers leave the stripper 670B in stripper effluent stream 672B, and the stripped downer catalyst leaves in stripped downer catalyst stream 671B. The stripped downer catalyst stream 671B is sent to a second regenerator 680B, where the stripped downer catalyst is regenerated by combusting coke and other deposits with air from second air stream 679B to produce regenerated downer catalyst and second regenerator flue gas. A person of ordinary skill will understand that the spent downer catalyst can be sent directly to the regenerator in some embodiments without stripping hydrocarbons and monomers from the spent catalyst. The regenerated downer catalyst leaves the second regenerator 680B in regenerated downer catalyst stream 681B, and the second regenerator flue gas leaves in second regenerator flue gas stream 682B. Make-up downer catalyst from make-up downer catalyst stream 683B can be combined with the regenerated downer catalyst stream 681B to produce the downer catalyst stream 684B.

Figure 2:
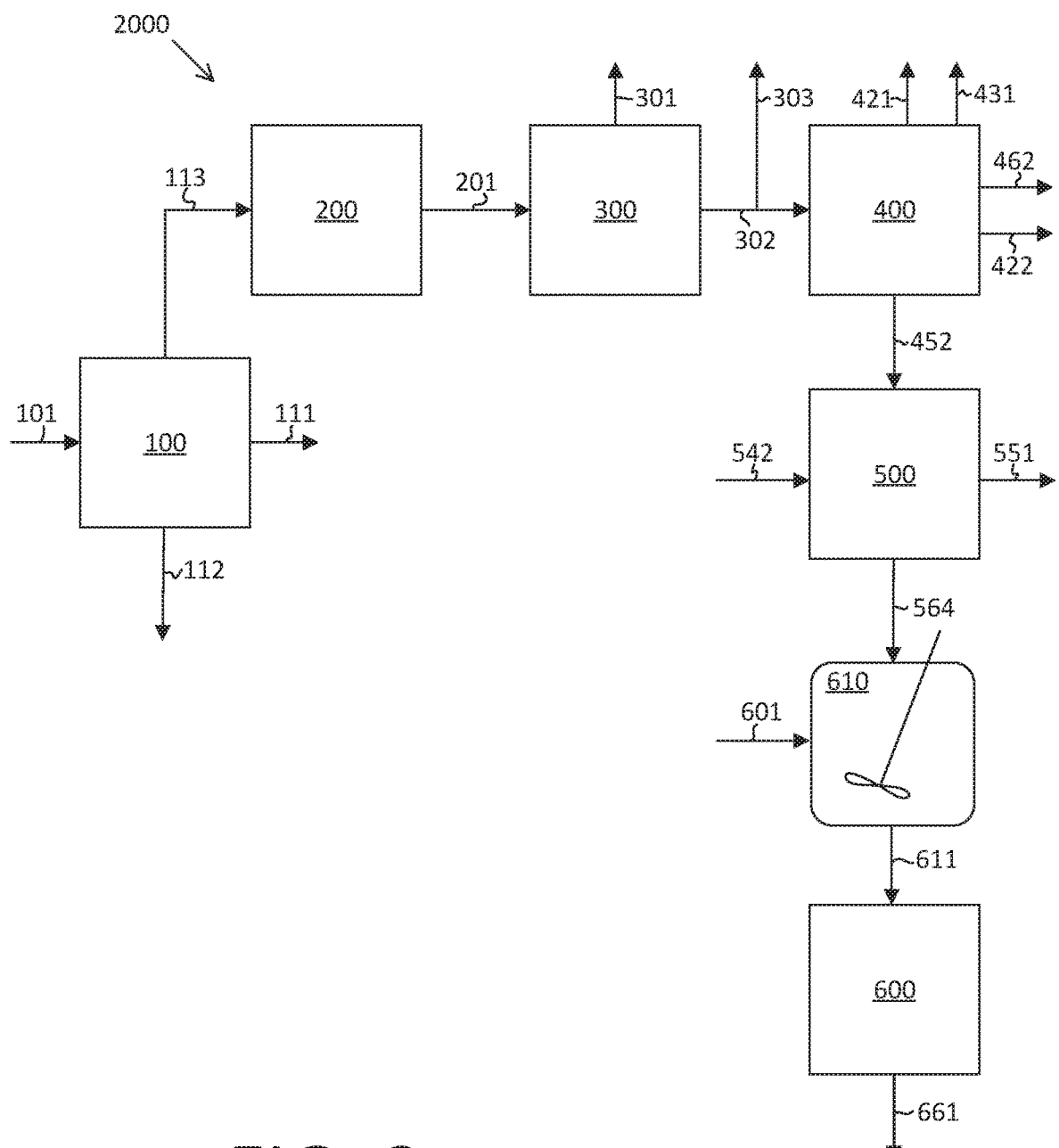
FIG. 2 is a schematic diagram of a process for converting waste polymer to a petrochemical product according to various embodiments using hydrodearylated aromatic bottoms from an aromatic recovery complex.

A schematic diagram of various embodiments of a process for converting waste polymer to a petrochemical product is shown in FIG. 2. In FIG. 2, crude oil is processed similar to the process shown and described in FIG. 1 and FIG. 3, except that aromatic bottoms stream 452 is sent to hydrodearylation unit 500 to produce hydrodearylated bottoms, which leave the hydrodearylation unit 500 in hydrodearylated aromatic bottoms stream 564. The hydrodearylated bottoms stream 564 is mixed with the plastic polymer material stream 601 to dissolve the plastic polymer material and produce dissolved plastic polymer stream 611. The dissolved plastic polymer stream 611 is then sent to FCC unit 600, where it is cracked in the presence of a catalyst similar to the processes shown and described in FIG. 1, FIG. 5, and FIG. 6.

Figure 4:
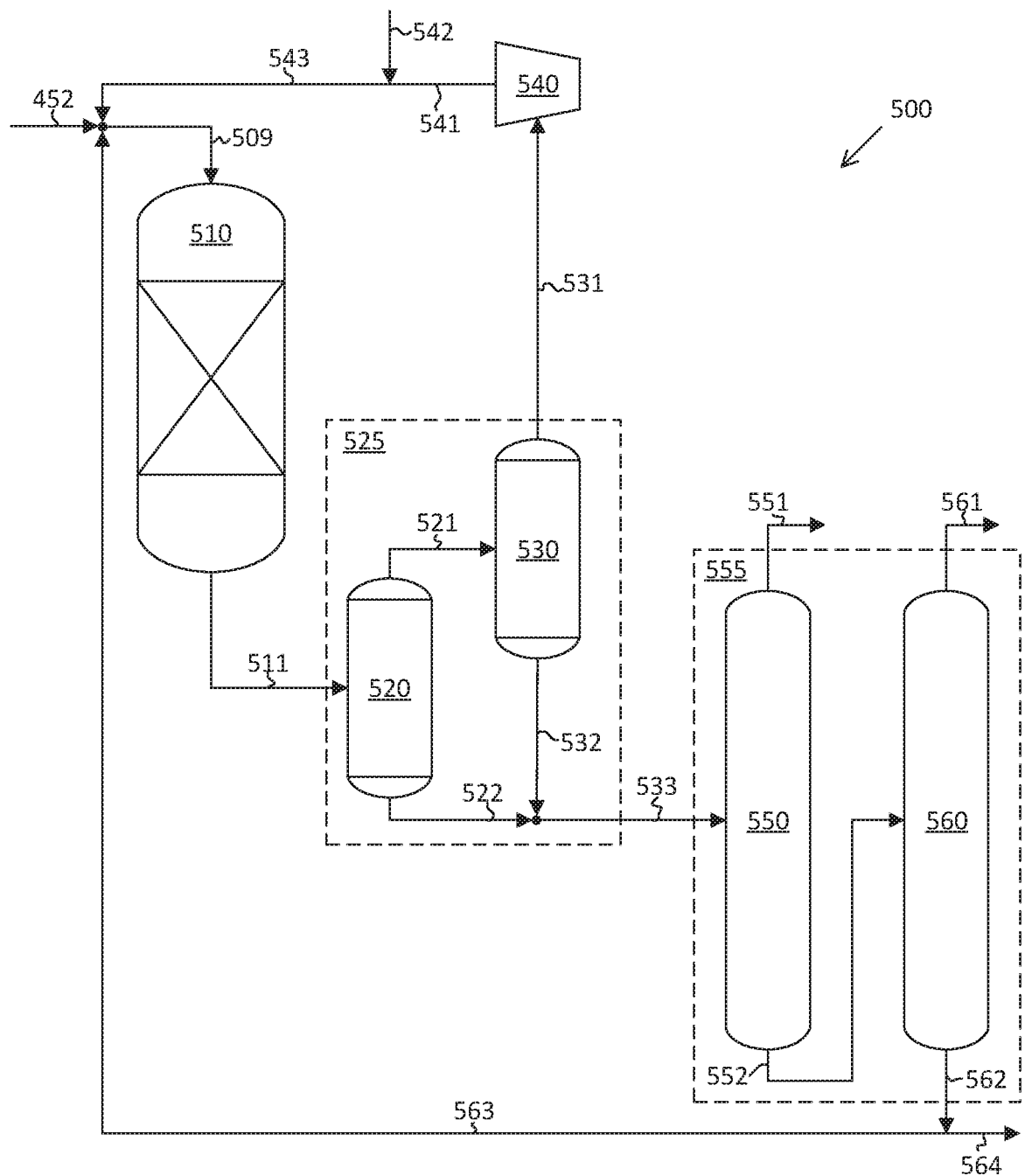
FIG. 4 is a schematic illustration of a hydrodearylation unit and process for hydrodearylating aromatic bottoms from an aromatic recovery complex.

In FIG. 4, a schematic diagram of a process for hydrodearylating the aromatic bottoms is shown. The hydrodearylation unit 500 can include a hydrodearylation reactor 510. The hydrodearylation reactor 510 can include an effective quantity of a suitable catalyst. The catalyst can be in a catalyst bed. The hydrodearylation reactor 510 can include an inlet for receiving a combined stream 509 including aromatic bottoms stream 452, a recycled heavy stream 563, and a combined hydrogen stream 543. In at least one embodiment, the aromatic bottoms stream 452 includes C9+ components in the absence of C8− components. In at least one embodiment, the aromatic bottoms stream 452 includes C10+ components in the absence of C9− components. In at least one embodiment, the aromatic bottoms stream 452 includes C11+ components in the absence of C10− components. The mixing unit 610 can be any equipment suitable for mixing the plastic polymer material and the aromatic bottoms.

A hydrodearylated effluent stream 511 can be discharged from an outlet of hydrodearylation reactor 510. The hydrodearylation reactor 510 can have a single or multiple catalyst beds and can receive quench hydrogen stream in between the beds of a multibed arrangement. Although not shown, the quench hydrogen stream can be a portion of the combined hydrogen stream 543 piped to the various locations of the catalyst beds in the hydrodearylation reactor 510.

In at least one embodiment, the degree of conversion in the hydrodearylation reactor 510 can be kept below a threshold to limit the amount of catalyst required and the amount of coking on the catalyst. By way of example and not limitation, a threshold limit can be 75% of a maximum potential conversion in the hydrodearylation reactor 510. The hydrodearylated effluent stream 511 can pass to a separation zone 525. The separation zone can include two separators, a hot separator 520 and a cold separator 530. The hot separator 520 can include an inlet for receiving the hydrodearylated effluent stream 511, an outlet for discharging a hydrodearylated gas stream 521, and an outlet for discharging a hot hydrodearylated liquid stream 522. The cold separator 530 can include an inlet for partially condensed hydrodearylated gas stream 521, an outlet for discharging a vapor stream 531 and outlet for discharging a hydrocarbon liquid stream 532. Heat exchangers can be included to cool the hydrodearylated gas stream 521 before entering subsequent cold separator 530. The heat exchangers are not shown and any design requirements for the heat exchangers are well understood by a person having ordinary skill in the art. The hydrodearylated gas stream 521 can include one or more gases selected from a group consisting of hydrogen, methane, ethane, C3+ hydrocarbons, and combinations thereof. The hydrodearylated gas stream 521 can exit the hot separator 520 and be fed to the cold separator 530.

The vapor stream 531 from cold separator 530 can be rich in hydrogen. The vapor stream 531 can be recycled to the hydrodearylation reactor 510 after compression with a compressor 540 to produce a compressed recycle stream 541.

The compressed recycle stream 541 can be combined with a hydrogen make-up stream 542. The hydrogen make-up stream 542 can include a high purity make-up gas substantially containing hydrogen from a header. The combined hydrogen stream 543 can be recycled back to the feed section through the header to provide hydrogen to the hydrodearylation reactor 510.

The hydrocarbon liquid stream 532 from the cold separator 530 can be preheated in a heat exchanger train (not shown). The hydrocarbon liquid stream 532 can be combined with the hot hydrodearylated liquid stream 522 to form a separator liquid effluent stream 533, which can flow to a fractionation zone 555.

The fractionation zone 555 can include a stripper column 550 and a splitter column 560. The columns 550, 560 can be reboiled fractionation columns. The separator liquid effluent stream 533 can enter the stripper column 550. The stripper column 550 can be a trayed column or a packed column, or a combination of the two types of columns. The stripper column 550 can separate the separator liquid effluent stream 533 into two streams, a light vapor stream 551 and a bottoms stream 552. The light vapor stream 551 can be condensed, and a portion can be used as a liquid reflux for the stripper column 550. A portion of the condensed and noncondensed light vapor stream 551 can be routed for further processing. By way of example and not limitation, the condensed and noncondensed light vapor stream 551 can be processed in a reformate splitter column or a heavy aromatics column within a para-xylene aromatic recovery complex. These details of further processing are not shown in FIG. 2 as they are understood by a person of ordinary skill in the art.

The bottoms stream 552 from stripper column 550 can be routed to the splitter column 560. The splitter column 560 can be a trayed column or a packed column, or a combination of the two types of columns. The splitter column 560 can form two streams, a light stream 561 and a heavy stream 562. The light stream 561 can include C6+ compounds. In at least one embodiment, the heavy stream 562 can include C10+ components. In at least one embodiment, C9 and C10 components can be removed from the aromatic bottoms stream 452 (for processing in a TA/TDP unit, for example) before it is sent to hydrodearylation unit 500; in such embodiments the heavy stream 562 can include C11+ components in the absence of C10− components.

The light stream 561 can be condensed and portion of the condensed light stream can be used as a liquid refluxed to the splitter column 560. A portion of the light stream 561 that is not refluxed to the splitter column 560 can be routed for further processing. By way of example, this portion of the light stream 561 can be routed to a reforming/para-xylene complex for xylene recovery. The heavy stream 562 can be split into two streams, a recycled heavy stream 563 and a hydrodearylated aromatic bottoms stream 564. The hydrodearylated aromatic bottoms stream 564 can then be sent to mixing unit 610 of FIG. 2. In at least one embodiment, the hydrodearylated aromatic bottoms stream 564 includes hydrodearylated hydrocarbons boiling above about 180° C. In at least one embodiment, the hydrodearylated aromatic bottoms stream 564 includes hydrodearylated hydrocarbons boiling in the diesel range. In at least one embodiment, the hydrodearylated aromatic bottoms stream 564 includes hydrodearylated C11+ hydrocarbons. In at least one embodiment, hydrocarbons boiling at temperatures below about 180° C. are absent in the hydrodearylated aromatic bottoms stream 564. In at least one embodiment, C10− hydrocarbons are absent in the hydrodearylated aromatic bottoms stream 564.

In at least one embodiment, the combined hydrogen stream 543 can be a once-through stream without recycling via vapor stream 531 and compressed recycle stream 541. Accordingly, a hydrogen make-up stream 542 can be added via a manifold to form combined hydrogen stream 543 without compressed recycle stream 541. In at least one embodiment, flashed gases from the cold separator 530 can be routed out of the hydrodearylation unit 500 and back to a hydrogen generation source (not shown). In at least one embodiment, when the combined hydrogen stream 543 is a once-through stream, the separator liquid effluent stream 533 can be directly routed to a xylene rerun column within a para-xylene complex.

In at least one embodiment, the hot and cold separators 520, 530 can be replaced by a single separator with a heat exchanger train to preheat the combined hydrogen stream 543 or the combined stream 509 with hydrodearylated effluent stream 511.

In at least one embodiment, the aromatic bottoms stream 452 can be a heavy hydrocarbons stream. The heavy hydrocarbons stream can include C9+, C10+, or C11+ components from a xylene rerun column or a heavy aromatic column bottoms from a p-xylene aromatic recovery complex, such as the aromatic recovery complex of FIG. 3. The aromatic bottoms stream 452 can include C9-C16+ hydrocarbons, and this stream can be predominantly mono-aromatics, di-aromatics, and poly-aromatics. The aromatic bottoms stream 452 can include alkyl-bridged noncondensed multiaromatics, condensed multiaromatics, heavy monoaromatics, and combinations of the same.

In at least one embodiment, the hydrodearylation reactor 510 can have a single catalyst bed or multiple catalyst beds. In at least one embodiment, the multiple catalyst beds can receive a quench hydrogen stream between the beds. Although not illustrated in FIG. 4, the combined hydrogen stream 543 can be introduced anywhere along the hydrodearylation reactor 510, and multiple hydrogen streams can be provided, depending upon the number of beds.

In at least one embodiment, the hydrodearylation reactor 510 can contain a catalyst having at least one International Union of Pure and Applied Chemistry (IUPAC) Group 8-10 metal, and at least one IUPAC Group 6 metal. The IUPAC Group 8-10 metal can be selected from the group consisting of iron, cobalt, and nickel, and combinations of the same. The IUPAC Group 6 metal can be selected from a group consisting of molybdenum and tungsten, and combinations thereof. The IUPAC Group 8-10 metal can be present in an amount of approximately 2-20 percent by weight (wt %), and the IUPAC Group 6 metal can be present in an amount of approximately 1-25 wt %. In at least one embodiment, the IUPAC Group 8-10 and IUPAC Group 6 metals can be on a support material. In at least one embodiment, the support material can be silica or alumina, and can further include an acidic component selected from the group consisting of an amorphous silica alumina, a zeolite or a combination of the two. In various embodiments, the hydrodearylation reactor 510 can contain a catalyst having any noble IUPAC Group 8-10 metal on a silica-alumina or alumina support having an acid cracking component of an amorphous silica-alumina or a zeolite, or a combination of the two. In certain embodiments, the hydrodearylation reactor 510 can contain a catalyst selected from the group consisting of platinum, palladium, and combinations thereof, on a silica-alumina or alumina support having an acid cracking component of an amorphous silica-alumina or a zeolite, or a combination of the two.

In at least one embodiment, operating conditions for the hydrodearylation reactor 510 can include a reaction temperature in the range of from about 200° C. to about 450° C. (392° F. to 840° F.), and a hydrogen partial pressure in the range of from about 5 bar gauge to about 80 bar gauge (70 psig to 1160 psig). In at least one embodiment, operating conditions for the hot separator 520 can include a temperature in the range of from about 200° C. to about 400° C. (392° F. to 750° F.), and a hydrogen partial pressure in the range of from 5 bar gauge to 80 bar gauge (70 psig to 1160 psig). In at least one embodiment, operating conditions for the cold separator 530 can include a temperature in the range of from 40° C. to 80° C. (104° F. to 176° F.), and a pressure in the range of from 5 bar gauge to 80 bar gauge (70 psig to 1160 psig). In at least one embodiment, operating conditions for the fractionation zone 555 can include a temperature in the range of from 40° C. to 300° C. (104° F. to 572° F.), and a pressure in the range of from 0.05 bar to 30 bar (0.73 psig to 435 psig).

EXAMPLES

The following examples are included to demonstrate embodiments of the disclosure, and should be considered nonlimiting. The techniques and compositions disclosed in the examples which follow represent techniques and compositions discovered to function well in the practice of the disclosure, and thus can be considered to constitute modes for its practice. However, changes can be made to the embodiments disclosed in the examples without departing from the spirit and scope of the disclosure.

Example 1—Dissolution of Plastic Polymer with Aromatic Bottoms Solvent

Polypropylene was fully dissolved in the aromatic bottoms from an aromatic recovery complex at a temperature of about 200° C. in an autoclave at autogenous pressure to yield a 2.3 wt % polypropylene solution. Upon dissolving the polypropylene, the mixture of polypropylene and aromatic bottoms was suitable for introducing to an FCC unit. Properties of the aromatic bottoms and the mixture of dissolved polypropylene in aromatic bottoms are tabulated in Table 1.

TABLE 1

Properties of aromatic bottoms from an aromatic recovery complex, and a mixture of dissolved polypropylene with aromatic bottoms.

| Properties | Aromatic bottoms | Mixture of aromatic bottoms and polyethene |
|---|---|---|
| Specific gravity, g/cm$^3$ | 0.9964 | 0.9907 |
| API gravity, degrees | 10.51 | 11.33 |
| Sulfur, ppmw | 330 | 286 |
| Nitrogen, ppmw | 6 | 5 |
| Carbon residue, wt % | 0.14 | 0.23 |
| Viscosity, cSt | | |
| 25° C. | 4.3 | — |
| 40° C. | 2.9 | 91.3 |
| 50° C. | — | 71.8 |
| 100° C. | — | 10.9 |
| Gross heat value, BTU/lb | — | 18,031 |
| Simulated distillation, ° C. | | |
| 0 wt % | 198 | 192 |
| 5 wt % | 201 | 199 |
| 10 wt % | 204 | 206 |
| 30 wt % | 226 | 242 |
| 50 wt % | 258 | 272 |

TABLE 1-continued

Properties of aromatic bottoms from an aromatic recovery complex, and a mixture of dissolved polypropylene with aromatic bottoms.

| Properties | Aromatic bottoms | Mixture of aromatic bottoms and polyethene |
|---|---|---|
| 70 wt % | 292 | 297 |
| 90 wt % | 332 | 324 |
| 95 wt % | 362 | 351 |
| 100 wt % | 468 | 476 |

Example 2—Catalytic Cracking of Polypropylene Dissolved in Aromatic Bottoms

The aromatic bottoms and the mixture of polypropylene dissolved in aromatic bottoms prepared in Example 1 were catalytically cracked in a fixed-bed microactivity test unit using ASTM method D3907. Test run 1 was carried out using the aromatic bottoms and a commercial proprietary FCC catalyst with a weight ratio of catalyst to feed of 4.09, temperature of 530° C., residence time of 30 seconds, and steaming using ASTM method D4463-96 at 810° C. for six hours. Three additional test runs (Test run 2, Test run 3, and Test run 4) were carried out using a fresh sample of the same catalyst and the mixture of polypropylene dissolved in aromatic bottoms with a weight ratio of catalyst to feed of 3.88, 3.95, and 4.04 respectively, temperature of 530° C., 600° C., and 650° C. respectively, residence time of 30 seconds, and steam at 810° C. for six hours. Table 2A shows material balance and product yield information for Test run 1, and Table 2B shows material balance and product yield information for Test run 1, Test run 2, and Test run 3.

TABLE 2A

Yield from catalytic cracking of aromatic bottoms from an aromatic recovery complex.

|  | Test run 1 |
|---|---|
| Temperature, ° C. | 530 |
| Catalyst/feed by weight | 4.09 |
| Yield, wt % |  |
| Hydrogen (H$_2$) | 0.0 |
| C1-C2 | 0.4 |
| C3-C4 | 0.2 |
| Ethene | 0.3 |
| Propene | 0.4 |
| Butenes | 0.4 |
| Gasoline | 40.0 |
| Light cycle oil | 45.7 |
| Heavy cycle oil | 8.4 |
| Coke | 4.2 |

TABLE 2B

Yield from catalytic cracking of mixture of polypropylene dissolved in aromatic bottoms from an aromatic recovery complex.

|  | Test run 2 | Test run 3 | Test run 4 |
|---|---|---|---|
| Temperature, ° C. | 530 | 600 | 650 |
| Catalyst/feed by weight | 3.88 | 3.95 | 4.04 |
| Yield, wt % |  |  |  |
| Hydrogen (H$_2$) | 0.0 | 0.1 | 0.2 |
| C1-C2 | 0.5 | 1.5 | 3.0 |
| C3-C4 | 0.3 | 0.3 | 0.3 |
| Ethene | 0.4 | 0.7 | 0.9 |

TABLE 2B-continued

Yield from catalytic cracking of mixture of polypropylene dissolved in aromatic bottoms from an aromatic recovery complex.

|  | Test run 2 | Test run 3 | Test run 4 |
|---|---|---|---|
| Propene | 0.5 | 0.7 | 0.7 |
| Butenes | 0.4 | 0.5 | 0.4 |
| Gasoline | 38.8 | 37.5 | 35.9 |
| Light cycle oil | 46.1 | 43.6 | 41.0 |
| Heavy cycle oil | 9.0 | 9.9 | 10.5 |
| Coke | 4.0 | 5.2 | 7.1 |

Since polypropylene accounts for only 2.3 wt % of the dissolved polypropylene mixture with aromatic bottoms, the two feeds are mostly similar. The results shown in Table 2B show that polypropylene is completely converted.

We claim:
1. A method for depolymerization of a plastic polymer, the method comprising:
  supplying the plastic polymer and aromatic bottoms from an aromatic recovery complex, the aromatic bottoms comprising C9+ aromatic compounds;
  dissolving the plastic polymer in the aromatic bottoms to obtain a dissolved plastic polymer solution comprising dissolved plastic polymer and C9+ aromatic compounds;
  catalytically cracking the dissolved plastic polymer solution in the presence of a catalyst such that the dissolved plastic polymer and the C9+ aromatic compounds are cracked to obtain light products.
2. The method of claim 1, wherein the aromatic bottoms comprises a compound selected from the group consisting of alkyl-bridged noncondensed multiaromatic compounds, condensed multiaromatic compounds, heavy alkyl aromatic compounds, and combinations of the same.
3. The method of claim 1, wherein the aromatic bottoms comprises C9+ hydrocarbons from a xylene rerun unit.
4. The method of claim 1, wherein the plastic polymer comprises a polymer selected from the group consisting of polyethene, polyethylene terephthalate, polystyrene, polyolefins, polypropylene, polyvinyl chloride, polyamide, polycarbonate, polyurethane, polyester, natural rubber, synthetic rubber, and combinations of the same.
5. The method of claim 1, wherein the step of catalytically cracking the dissolved plastic polymer solution further comprises catalytically cracking the dissolved plastic polymer solution in a riser FCC reactor.
6. The method of claim 1, wherein the step of catalytically cracking the dissolved plastic polymer solution further comprises catalytically cracking the dissolved plastic polymer solution in a downer FCC reactor.
7. The method of claim 1, wherein the light products comprise a molecules selected from the group consisting of propene, ethene, butenes, benzene, toluene, xylenes, and combinations of the same.
8. The method of claim 1, wherein the plastic polymer comprises waste plastic polymer.
9. The method of claim 1, wherein the step of supplying the plastic polymer further comprises crushing the plastic polymer such that the plastic polymer has an average particle size that is between 0.01 centimeters (cm) and 6 cm.
10. The method of claim 1, wherein the plastic polymer is completely dissolved in the aromatic bottoms.
11. The method of claim 1, wherein the dissolved plastic polymer solution is saturated with the dissolved plastic polymer.

12. A method for depolymerization of a plastic polymer, the method comprising:

supplying an aromatic bottoms from an aromatic recovery complex, the aromatic bottoms comprising C9+ aromatic compounds and having a boiling point of at least 180° C.;

hydrodearylating the aromatic bottoms to obtain hydrodearylated aromatic bottoms; supplying the plastic polymer and dissolving it in the hydrodearylated aromatic bottoms to obtain a dissolved plastic polymer solution comprising dissolved plastic polymer and C9+ aromatic compounds;

catalytically cracking the dissolved plastic polymer solution in the presence of a catalyst such that the dissolved plastic polymer and the C9+ aromatic compounds are cracked to obtain light products.

13. The method of claim 12, wherein the aromatic bottoms comprises a compound selected from the group consisting of alkyl-bridged noncondensed multiaromatic compounds, condensed multiaromatic compounds, heavy alkyl aromatic compounds, and combinations of the same.

14. The method of claim 12, wherein the aromatic bottoms comprises C9+ hydrocarbons from a xylene rerun unit.

15. The method of claim 12, wherein the plastic polymer comprises a polymer selected from the group consisting of polyethene, polyethylene terephthalate, polystyrene, polyolefins, polypropylene, polyvinyl chloride, polyamide, polycarbonate, polyurethane, polyester, natural rubber, synthetic rubber, and combinations of the same.

16. The method of claim 12, wherein the step of catalytically cracking the dissolved plastic polymer solution further comprises catalytically cracking the dissolved plastic polymer solution in a riser FCC reactor.

17. The method of claim 12, wherein the step of catalytically cracking the dissolved plastic polymer solution further comprises catalytically cracking the dissolved plastic polymer solution in a downer FCC reactor.

18. The method of claim 17, wherein the downer FCC reactor is operated at a temperature between 550° C. and 650° C.

19. The method of claim 18, wherein the downer FCC reactor is operated such that the catalyst and the dissolved plastic polymer solution have a residence time between 0.1 seconds and 1 second.

20. The method of claim 19, wherein the catalyst and the dissolved plastic polymer solution are introduced to the downer FCC reactor with a weight ratio of catalyst to dissolved plastic polymer solution that is between 15 and 40.

21. The method of claim 12, wherein the light products comprise a molecules selected from the group consisting of propene, ethene, butenes, benzene, toluene, xylenes, and combinations of the same.

* * * * *